United States Patent
Zhu et al.

(10) Patent No.: US 10,102,941 B2
(45) Date of Patent: Oct. 16, 2018

(54) FLEXIBLE FIBER AND RESIN COMPOSITE CORE OVERHEAD WIRE AND PRODUCTION METHOD THEREOF

(71) Applicant: Fogang Xinyuan HengYe Cable Technology Co., Ltd., Guangdong Province (CN)

(72) Inventors: Yan Zhu, Guangdong Province (CN); Qingming Wang, Guangdong Province (CN)

(73) Assignee: Fogang Xinyuan HengYe Cable Technology Co., LTD (CN)

( * ) Notice: Subject to any disclaimer, the term of this patent is extended or adjusted under 35 U.S.C. 154(b) by 0 days.

(21) Appl. No.: 15/278,827

(22) Filed: Sep. 28, 2016

(65) Prior Publication Data
US 2018/0090241 A1    Mar. 29, 2018

(51) Int. Cl.
| H01B 7/00 | (2006.01) |
| H01B 5/08 | (2006.01) |
| H01B 11/22 | (2006.01) |
| H01B 11/00 | (2006.01) |
| H01B 13/02 | (2006.01) |
| H01B 13/00 | (2006.01) |

(52) U.S. Cl.
CPC .............. *H01B 5/08* (2013.01); *H01B 11/007* (2013.01); *H01B 11/22* (2013.01); *H01B 13/0016* (2013.01); *H01B 13/02* (2013.01); *H01B 13/0292* (2013.01)

(58) Field of Classification Search
CPC .......... H01B 1/023; H01B 5/105; H01B 7/02; H01R 43/00
USPC ............ 174/40 R, 45 TD, 74 R, 84 R, 88 R, 174/128.1, 102 R, 106 R, 108, 109
See application file for complete search history.

(56) References Cited

U.S. PATENT DOCUMENTS

| 4,365,865 A * | 12/1982 | Stiles | G02B 6/4416 |
| | | | 174/70 R |
| 4,394,694 A * | 7/1983 | Ninomiya | G11B 27/002 |
| | | | 360/73.02 |
| 4,696,542 A * | 9/1987 | Thompson | D07B 1/0693 |
| | | | 385/107 |
| 5,223,349 A * | 6/1993 | Kudo | B21C 37/042 |
| | | | 428/652 |
| 6,600,108 B1 * | 7/2003 | Mydur | H01B 7/046 |
| | | | 174/120 R |
| 7,462,781 B2 * | 12/2008 | Varkey | H01B 7/046 |
| | | | 174/102 R |

(Continued)

FOREIGN PATENT DOCUMENTS

CN    103730203    *    4/2014    .............. H01B 5/08

*Primary Examiner* — William H Mayo, III
(74) *Attorney, Agent, or Firm* — Fay Sharpe LLP; James E. Scarbrough (57) ABSTRACT

An overhead wire has a wire core having a main core and a plurality of auxiliary cores spirally and tightly stranded on the main core, and a conducting layer coating the wire core and having at least one aluminum wire layer. The main core and the auxiliary cores has fiber resin strands formed by fiber filament bundles permeated with resin through molding, and fiber filaments wound on and completely covering the fiber resin strands such that the fiber resin strand is isolated from the outside, and the at least one aluminum wire layer has a plurality of aluminum wires spirally and tightly stranded on the wire core.

7 Claims, 5 Drawing Sheets

(56) References Cited

U.S. PATENT DOCUMENTS

| | | | | |
|---|---|---|---|---|
| 7,547,843 B2* | 6/2009 | Deve | ........................ | H02G 7/02 |
| | | | | 174/40 R |
| 8,921,698 B2* | 12/2014 | Vander Lind | ............. | F03D 5/00 |
| | | | | 174/102 R |
| 9,012,781 B2* | 4/2015 | Daniel | .................. | B29C 70/523 |
| | | | | 174/102 R |
| 9,093,191 B2* | 7/2015 | Hiel | ........................ | B32B 15/04 |
| 2012/0305312 A1* | 12/2012 | McCullough | ........... | F16G 11/02 |
| | | | | 174/75 R |
| 2015/0194240 A1* | 7/2015 | Ranganathan | ......... | H01B 7/292 |
| | | | | 174/126.2 |
| 2015/0325337 A1* | 11/2015 | McCullough | ............ | H01B 7/14 |
| | | | | 174/113 R |
| 2017/0148548 A1* | 5/2017 | Dolan | .................... | H01B 7/421 |

* cited by examiner

FLEXIBLE FIBER AND RESIN COMPOSITE CORE OVERHEAD WIRE AND PRODUCTION METHOD THEREOF

FIELD OF THE DISCLOSURE

The disclosure is applicable in the field of overhead cables, and in more particular relates to a flexible fiber and resin composite core overhead wire and a production method thereof.

BACKGROUND OF THE DISCLOSURE

Conventional power transmission is carried out via a steel-cored aluminum wire. As this type of wires is significantly influenced by temperature during a power transmission process, sag problems are inevitable. Recently, a novel carbon fiber composite core wire was provided in the prior art, which is formed by fibers used as aggregates compounded with a resin matrix consisting of various substances, and the wire core is coated with a conductor. By having a higher elastic modulus and a smaller thermal expansion coefficient, such a wire core has an improved ampere capacity, thus the wire not only is high in transmission capacity, but also has high-temperature resistance, without a significant sag, thereby exhibiting excellent performance and long service life. The wire represents a trend in power transmission line development.

A carbon fiber composite core of an existing carbon fiber composite core aluminum wire mostly consists of a single carbon fiber bar, i.e. a bar-type carbon fiber composite core is used as a reinforced core. Due to the limitations of its bar-type carbon core structure and bending performance, only a carbon fiber composite core having an area of smaller than 95 mm2 (the diameter is smaller than 11 mm) can be produced, but the sagging performance of such a wire cannot meet the requirements of some specific projects. Moreover, a tension hardware fitting adopted by the existing bar-type carbon fiber aluminum wire is of a wedge-shaped structure, and in the cases of temperature changing or the wire moving, or swinging due to wind, safety cannot be maintained for long. Moreover, the bar-type carbon core structure used in an existing large-sized bar-type carbon fiber wire is very poor in flexibility, and thus the construction quality is difficult to be guaranteed.

Thus, there is a need for an improved flexible fiber and resin composite core overhead wire which overcomes the above mentioned deficiencies and others while providing better overall results.

SUMMARY OF THE DISCLOSURE

In order to solve the above discussed problems, in accordance with one embodiment of the disclosure, a flexible fiber and resin composite core overhead wire and a production method thereof is provided. Performance of the flexible fiber and resin composite core overhead wire can be maintained for a long time, safety of the flexible fiber and resin composite core overhead wire can be ensured, and the flexible fiber and resin composite core overhead wire is convenient to be installed and is suitable to be widely produced and applied.

In accordance with another embodiment of the disclosure, a flexible fiber and resin composite core overhead wire house a wire core, having a main core and a plurality of auxiliary cores spirally and tightly stranded on the main core. The main core and the auxiliary cores have fiber resin strands formed by fiber filament bundles permeated with resin through moulding; fiber filaments, wound on and completely covering the fiber resin strands such that the fiber resin strand is isolated from the outside; and a conducting layer coating the wire core, and having at least one aluminum wire layer, wherein the at least one aluminum wire layer has a plurality of aluminum wires spirally and tightly stranded on the wire core.

In accordance with another embodiment of the disclosure, the main core and the auxiliary cores have at least one optical fiber unit strand, and at least one optical fiber unit strand has at least one optical fiber arranged therein.

In accordance with another embodiment of the disclosure, the main core has 1 to 5 fiber resin strands and/or optical fiber unit strands, and one or two layers of the auxiliary cores are arranged on an outer side of the main core. In the case of one layer of the auxiliary cores, 3 to 36 auxiliary cores are stranded as one layer on the main core. In the case of two layers of the auxiliary cores, 3 to 36 auxiliary cores are stranded as an inner layer on the main core, and another 7 to 42 auxiliary cores are stranded as an outer layer on an outer side of the inner layer of the auxiliary cores, and the two layers of auxiliary cores are opposite in stranding direction.

In accordance with still another embodiment of the disclosure, the stranding direction of the aluminum wires of the aluminum wire layer adjacent to the wire core is opposite to the stranding direction of the auxiliary cores, and in the case of at least two aluminum wire layers, the aluminum wires in each two adjacent aluminum wire layers are opposite in stranding direction.

In accordance with another embodiment of the disclosure, the conducting layer has four aluminum wire layers, of which the aluminum wires have a trapezoid cross section, the four aluminum wire layers have m, n, o and p aluminum wires from inside to outside respectively, which are natural numbers greater than 5.

In accordance with another embodiment of the present disclosure, the aluminum wires have a trapezoid, Z-shaped or circular cross section.

In accordance with another embodiment of the disclosure, the conducting layer has an inner aluminum wire layer and an outer aluminum wire layer, the aluminum wires of the inner aluminum wire layer have a concave cross section, and the aluminum wires of the outer aluminum wire layer have a convex cross section matched with the concave cross section of the inner aluminum wire layer; the aluminum wires of the inner aluminum wire layer have a convex cross section, and the aluminum wires of the outer aluminum wire layer have a concave cross section matched with the convex cross section of the inner aluminum wire layer.

In accordance with another embodiment of the disclosure, the flexible fiber and resin composite core overhead wire further has a strain clamp and an intermediate connecting tube, wherein the strain clamp has a clamp body, a steel anchor and a jumper wire clamper. The steel anchor has an anchor ring and an anchor body inserted into a front end of the clamp body. The anchor body has a pressure connecting part, a composite core connecting part and a first liner tube, wherein the pressure connecting part is provided with a plurality of annular grooves formed on an outer wall thereof. The composite core connecting part is provided with an insertion hole formed therein, in which the first liner tube is arranged for tightly embracing the wire core. The clamp body has a steel anchor pressure connecting end formed at a front end thereof for a pressure connection with the pressure connecting part of the anchor body, and a wire pressure connecting end formed at a rear end thereof for a pressure connection with the conducting layer. The jumper wire clamper has a connecting block and a drainage block, wherein the connecting block has a hoop sleeved and welded on a middle part of the clamp body, and a drainage seat drooping downwards. The drainage seat is provided with a groove with an inverted U-shaped cross section formed at a lower portion thereof, and a deformation slot formed in a bottom position of the groove. The drainage seat is further provided with bolt holes formed at both sides of the groove. A top end of the drainage block is embedded into the groove and fastened by bolts mounted in the bolt holes. The intermediate connecting tube has a second liner tube for pressure-connecting two wire cores, and a steel tube and an aluminum tube for pressure-connecting two conducting layers and the aluminum tube is sleeved on the steel tube.

In accordance with another embodiment of the disclosure, a production method of the flexible fiber and resin composite core overhead wire, includes the following steps:

S1: preparing fiber resin strands via moulding with fiber filament bundles permeated with resin, and winding fiber filaments on each of the fiber resin strands, wherein the fiber resin strands have a circular, semicircular shape, polygonal cross section or their combinations, and the fiber filaments completely cover the fiber resin strands so as to isolate the fiber resin strands from the outside;

S2: stranding the fiber resin strands into one core having a circular, semicircular, or a polygonal cross section or their combinations, followed by heating the core gained via a heating device to obtain a flexible fiber and resin composite core, wherein one of the fiber resin strands is served as a main core and the other fiber resin strands are served as the auxiliary cores; and S3: according to a structure of the overhead wire, winding a duralumin or semi-duralumin or soft aluminum or heat-resisting aluminum alloy conducting layer on the flexible fiber and resin composite core which is served as a reinforced core to obtain the flexible fiber and resin composite core overhead wire.

In accordance with another embodiment of the disclosure, step S2 further includes:

replacing one or more of the fiber resin strands which is served as the main core or the auxiliary cores with optical fiber unit strands, wherein each of the optical fiber unit strands has at least one optical fiber in the inside thereof, the auxiliary cores are spirally and closely stranded on the main core to form a flexible fiber and optical fiber composite core, the flexible fiber and resin composite core and the flexible fiber and optical fiber composite core are additionally covered by an aluminum tubular layer or wrapped an aluminum-plastic compound tape.

In accordance with still another embodiment of the disclosure, some beneficial effects are that: compared with a conventional wire, the flexible fiber and resin composite core overhead wire has a series of advantages such as light weight, high tensile strength, high heat resistance, small thermal expansion coefficient, small high-temperature sag, high electrical conductivity, low line loss, high current-carrying capacity, high corrosion resistance, difficulty in ice coating, stable performance for long time, guarantee of safety performance, convenience for installation and the like, and it is an environmental-friendly power transmission line wire, has the epoch-making practical significance on the aspects of protecting the environment, saving energy, reducing emission and improving the human ecological environment, and is suitable to widely produce and apply.

Still other aspects of the disclosure will be apparent upon a reading and understanding of the following detailed description.

BRIEF DESCRIPTION OF DRAWINGS

The disclosure will be further described by embodiments with reference to the accompanying drawings, wherein.

DETAILED DESCRIPTION OF THE EMBODIMENTS

In FIGS. 1 to 20, some specific structures of preferred embodiments of the disclosure are shown. Structural characteristics of the components according to the disclosure will be described in detail in the following discussion.

Figure 1:
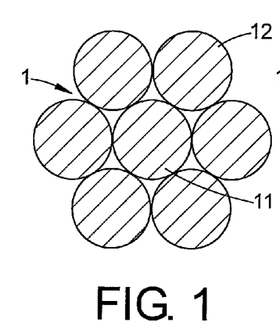
FIG. 1 is a schematic view of a wire core according a first embodiment of the disclosure.

Referring to FIG. 1, the disclosure provides a flexible fiber and resin composite core overhead wire which has a wire core 1, and a conducting layer 2 wrapping the wire core 1. As shown in FIG. 1, the wire core 1 has a main core 11 and a plurality of auxiliary cores 12 spirally and closely stranded on the main core 11. The main core 11 and the auxiliary cores 12 have fiber resin strands, which are formed by resin-permeated fiber filament bundles through moulding.

Fiber filaments are wound on an outer surfaces of each of the fiber resin strands and thus completely cover the fiber resin strands to isolate the fiber resin strands from the outside to protect the fiber resin strands from damage by friction, as well as to avoid direct contact between the fiber resin strands and an conductive aluminum wire for the overhead wire to avoid chemical corrosion between the fiber resin strands and the aluminum wire. The conducting layer 2 has at least one aluminum wire layer having a plurality of aluminum wires spirally and closely stranded on an outer side of the wire core 1.

Figure 2:
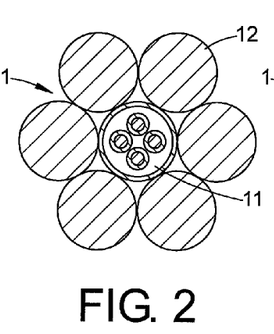
FIG. 2 is a schematic view of a wire core according to a second embodiment of the disclosure.
Figure 3:
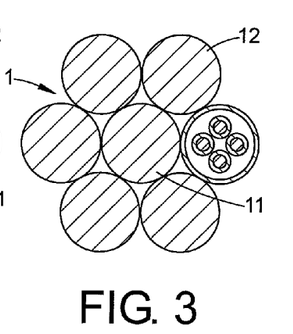
FIG. 3 is a schematic view of a wire core according to a third embodiment of the disclosure.

Referring now to FIGS. 2 and 3, the main core 11 and the auxiliary cores 12 of the wire core 1 has one or more optical fiber unit strands, and each of the optical fiber unit strands has at least one optical fiber arranged therein. In other words, one or more of the fiber resin strands are replaced with the optical fiber unit strands to form a flexible fiber and resin composite core comprehensive optical fiber overhead wire with communication optical fibers. A resulting product can resist a temperature of 150° C. and above, as well as has strength of 2100 MPa and above. The overhead wire with optical fiber units has a communication function.

According to a preferred embodiment of the disclosure, the wire core 1 is served as a reinforced core, and an aluminum alloy conducting layer 2 is wound on an outer side of the wire core 1 according to a structure of the overhead wire. Specifically, the aluminum alloy conducting layer 2 may be a duralumin or semi-duralumin or soft aluminum or heat-resisting aluminum alloy conducting layer, with a circular, trapezoid, or S-shaped wire shape, or their combinations, resulting in various forms of flexible fiber and resin composite core overhead wires and flexible fiber and resin composite core comprehensive optical fiber overhead wires. Compared with a single-core fiber (bar-type) composite core with a conventional structure, the flexible fiber and resin composite core comprehensive optical fiber overhead wire according to the disclosure has higher flexibility and can guarantee a construction project to be successfully carried out. Moreover, the flexible fiber and resin composite core comprehensive optical fiber overhead wire according to the disclosure has excellent sagging performance, and thus is more suitable for an extra-large span line.

In further detail, the main core 11 preferably has 1 to 5 fiber resin strands and/or optical fiber unit strands, and one or two layers of auxiliary cores 12 are arranged on the outer side of the main core 11. In the case of one layer of auxiliary cores 12 arranged, 3 to 36 auxiliary cores 12 are stranded into one layer on the main core 11. In the case of two layers of auxiliary cores arranged, 3 to 36 auxiliary cores 12 are stranded into an inner layer on the outer side of the main core 11, and 7 to 42 auxiliary cores 12 are stranded into an outer layer on an outer side of the inner layer of the auxiliary cores 12, wherein the two layers of auxiliary cores 12 are opposite in stranding direction.

Figure 4:
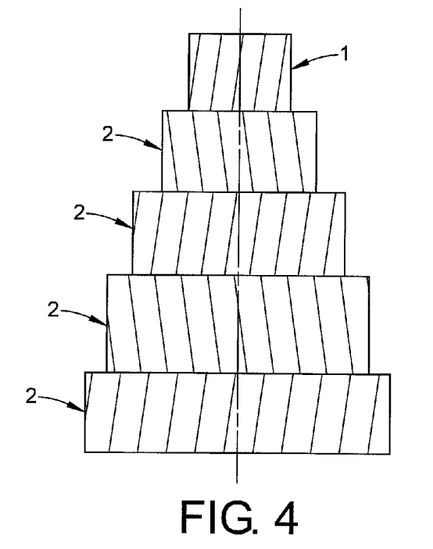
FIG. 4 is a front elevational view of a wire according to the disclosure.

Referring now to FIG. 4, the stranding direction of the aluminum wires of the aluminum wire layer adjacent to the wire core 1 is opposite to the stranding direction of the auxiliary cores 12, and when the conducting layer 2 has at least two aluminum wire layers, the aluminum wires in each two adjacent aluminum wire layers are opposite in stranding direction.

Figure 5:
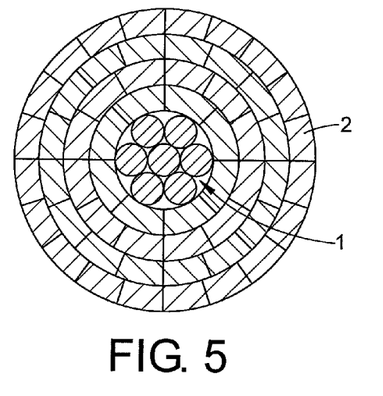
FIG. 5 is a schematic view of a wire according to a first embodiment of the disclosure.
Figure 6:
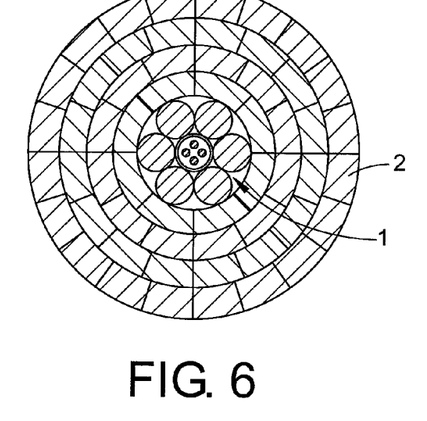
FIG. 6 is a schematic view of a wire according to a second embodiment of the disclosure.
Figure 7:
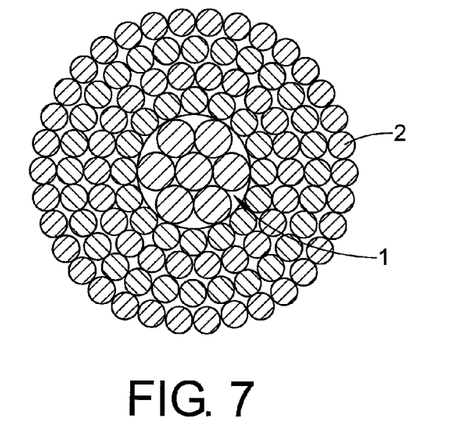
FIG. 7 is a schematic view of a wire according to a third embodiment of the disclosure.
Figure 8:
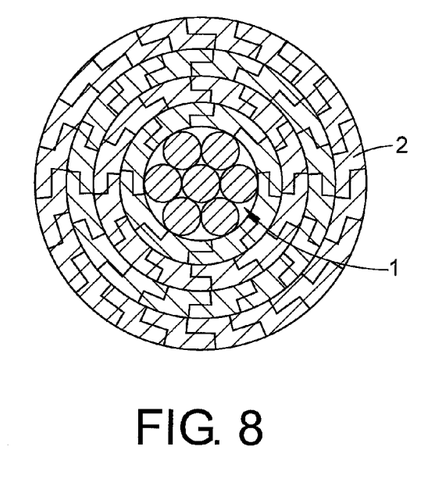
FIG. 8 is a schematic view of a wire according to a fourth embodiment of the disclosure.
Figure 9:
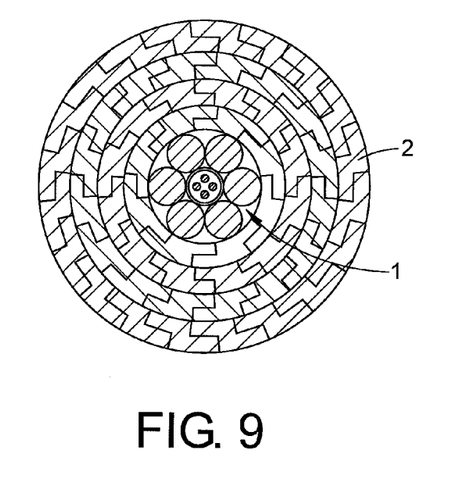
FIG. 9 is a schematic view of a wire according to a fifth embodiment of the disclosure.
Figure 10:
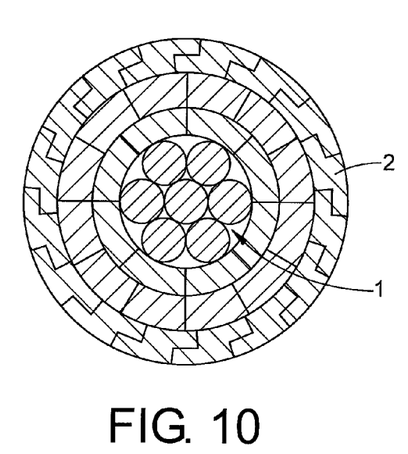
FIG. 10 is a schematic view of a wire according to a sixth embodiment of the disclosure.
Figure 11:
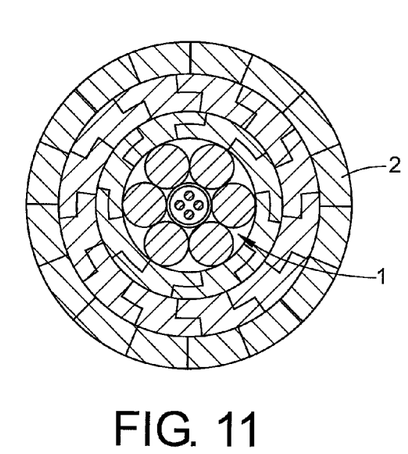
FIG. 11 is a schematic view of a wire according to a seventh embodiment of the disclosure.
Figure 12:
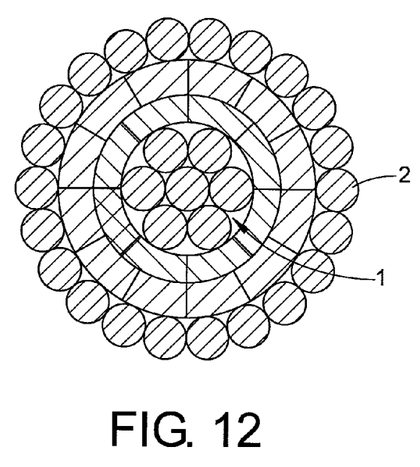
FIG. 12 is a schematic view of a wire according to an eighth embodiment of the disclosure.
Figure 13:
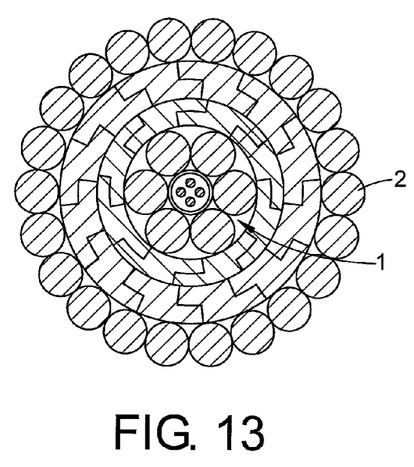
FIG. 13 is a schematic view of a wire according to a ninth embodiment of the disclosure.

Referring to FIGS. 5 and 6, the conducting layer 2 has four aluminum wire layers, of which the aluminum wires have a trapezoid cross section. The four aluminum wire layers respectively have a number of m, n, o and p aluminum wires from inside to outside sequentially, wherein m, n, o and p are natural numbers greater than 5.

As shown in FIGS. 7 to 15, the aluminum wires preferably have a trapezoid, Z or circular cross section, or their combinations, resulting in various wire forms.

Figure 14:
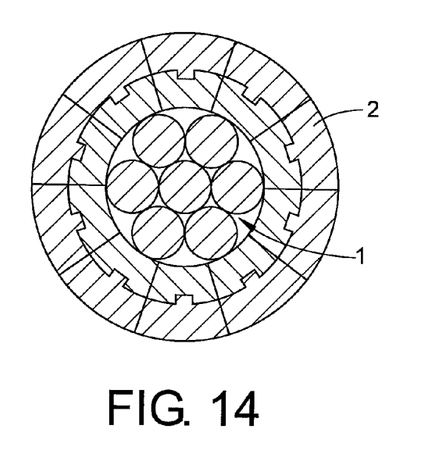
FIG. 14 is a schematic view of a wire according to a tenth embodiment of the disclosure.
Figure 15:
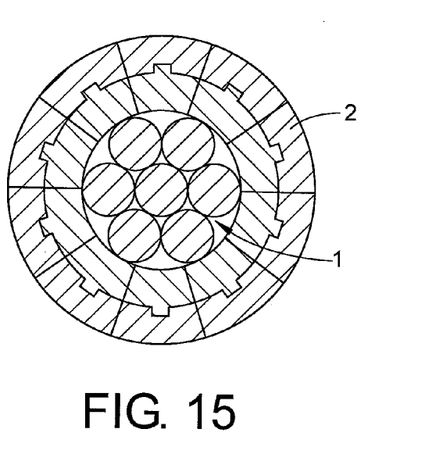
FIG. 15 is a schematic view of a wire according to an eleventh embodiment of the disclosure.

Specifically, as shown in FIGS. 14 and 15, the aluminum wire layers are divided into an inner layer and an outer layer, the aluminum wires in the inner layer have a concave cross section, and the aluminum wires in the outer layer have a convex cross section matched with the concave cross section of the aluminum wires in the inner layer. Alternatively, the aluminum wires in the outer layer have a concave cross section, and the aluminum wires in the inner layer have a convex cross section matched with the concave cross section of the aluminum wires in the outer layer. In such a concave and convex arrangement, the number of the soft aluminum wires in the inner layer is equal to that of the soft aluminum wires in the outer layer, the aluminum wires are one-to-one matched, so that the inner and outer layers of the soft aluminum wires can be more tightly connected.

Referring now to FIGS. 16 to 20, the flexible fiber and resin composite core overhead wire according to the disclosure further has a strain clamp 3. The strain clamp 3 has a clamp body 31, a steel anchor 32 and a jumper wire clamper 33. The steel anchor 32 has an anchor ring 34 and an anchor body inserted into a front end of the clamp body 31. The anchor body has a pressure connecting part 35 provided with a plurality of circular grooves formed on an outer wall thereof, and a composite core connecting part 36 provided with an insertion hole formed therein.

Figure 16:
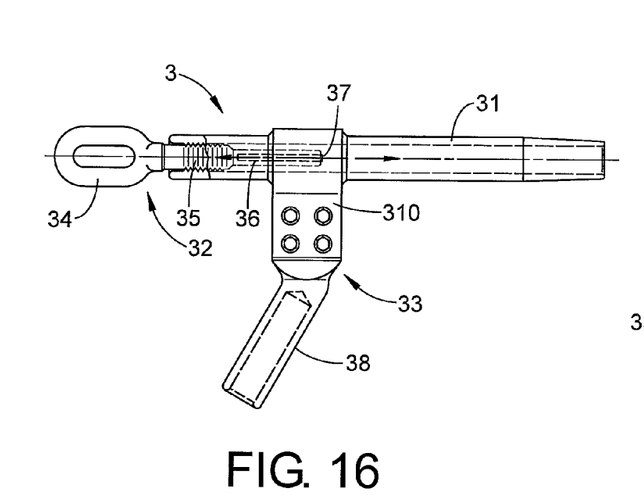
FIG. 16 is a front elevational view of a strain clamp according to the disclosure.
Figure 17:
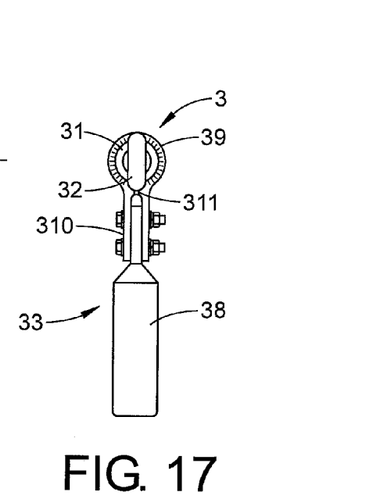
FIG. 17 is a side elevational view of the strain clamp according to the disclosure.

The strain clamp 3 further has a first liner tube 37 arranged in the insertion hole for embracing the wire core 1. The clamp body 31 has a steel anchor pressure connecting end formed at a front end thereof and capable of maintaining a pressure connection with the pressure connecting part 35 of the anchor body, and a wire pressure connecting end formed at a rear end thereof and capable of maintaining a pressure connection with the conducting layer 2. The jumper wire clamper 33 has a connecting block and a drainage block 38, wherein the connecting block has a hoop 39 sleeved and welded on a middle part of the clamp body 31, and a drainage seat 310 drooping downwards. The drainage seat 310 is provided with a groove formed at a lower part thereof and having an inverted U-shaped cross section, and a deformation slot 311 formed in a bottom portion of the groove. The drainage seat 310 is further provided with bolt holes formed at both sides of the groove. A top end of the drainage block 38 is embedded into the groove and is fastened by bolts mounted in the bolt holes.

To connect the wire with the strain clamp 3, first strip out the wire core 1, sleeve the first liner tube 37 on the wire core 1, and then insert the wire core 1 sleeve with the first liner tube 37 into the insertion hole formed on the composite core connecting part and pressure them for connection, and then insert the steel anchor 32 into the clamp body 31 such that the steel anchor pressure connecting end of the clamp body 31 is pressure-connected with the pressure connecting part 35 of the anchor body, and finally pressure-connect the wire pressure connect end with the conducting layer 2.

Figure 18:
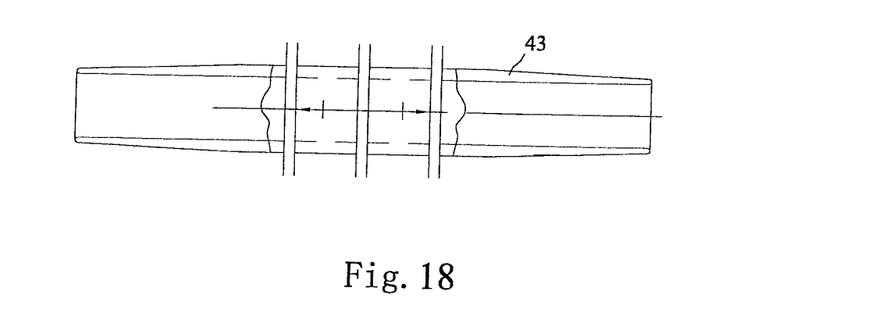
FIG. 18 is a schematic view of an aluminum tube of an intermediate connecting tube according to the disclosure.
Figure 19:
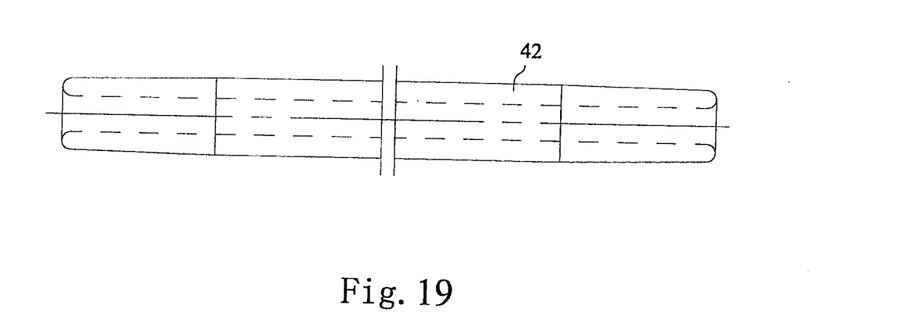
FIG. 19 is a schematic view of a steel tube of the intermediate connecting tube according to the disclosure.
Figure 20:
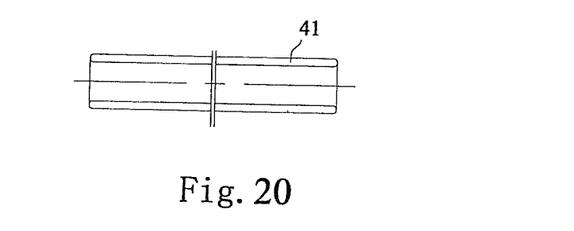
FIG. 20 is a schematic view of a second liner tube of the intermediate connecting tube according to the disclosure.

The flexible fiber and resin composite core overhead wire further includes an intermediate connecting tube for connecting two wires. The intermediate connecting tube has a second liner tube 41 for pressure-connecting two wire cores, a steel tube 42 for pressure-connecting two conducting layers, and an aluminum tube 43 sleeved on the steel tube 42. As the pressure connecting type strain clamp 3 and the intermediate connecting tube are used, the flexible fiber and resin composite core overhead wire according to the disclosure can provide higher safety and greater construction convenience than a wire with the single-core fiber (bar-type) composite core in which a wedge-shaped locking type tension hardware fitting is used.

The pressure connecting type strain clamp 3 and intermediate connecting tube have a modular structure, solving an engineering difficulty in the existing art that the flexible fiber and resin composite core overhead wire cannot be connected with the strain clamp and the intermediate connecting tube, and maximizing the mechanical performance of the flexible resin fiber composite core overhead wire.

The disclosure further provides a production method of the flexible fiber and resin composite core overhead wire, including the following steps:

Step 1 (S1): forming fiber resin strands with resin-permeated fiber filament bundles through moulding, and wrapping fiber filaments on an outer side of the fiber resin strands formed, wherein the fiber resin strands have a circular, semicircular, or a polygonal cross section or their combinations, and the fiber filaments completely cover the fiber resin strands to isolate the fiber resin strands from the outside to protect the fiber resin strands from friction damage, as well as to avoid direct contact between the fiber resin strands and an electrical aluminum wire for the overhead wire to avoid chemical corrosion between the fiber resin strands and the aluminum wire;

Step 2 (S2): stranding one of the fiber resin strands, served as a main core, with the other fiber resin strands, served as auxiliary cores, into one having a circular, semicircular or polygon cross section or their combinations, followed by heating them via a heating device to form a flexible fiber and resin composite core via; and Step 3 (S3): according to a structure of the overhead wire, winding a duralumin or semi-duralumin or soft aluminum or heat-resisting aluminum alloy conducting layer on an outer side of the flexible fiber and resin composite core which is served as a reinforced core to form the flexible fiber and resin composite core overhead wire.

Specifically, in step S2, one or more of the fiber resin strands may be replaced by optical fiber unit strands, served as the main core or the auxiliary cores, wherein each of the optical fiber unit strands comprises at least one optical fiber therein. The auxiliary cores are spirally and closely stranded on the main core to form a flexible fiber and optical fiber composite core, and additionally, an aluminum tubular layer or an aluminum-plastic compound tape is wrapped on an outer side of the flexible fiber and resin composite core and the flexible fiber and optical fiber composite core.

One aspect of the disclosure is the flexible fiber and resin composite core overhead wire or the flexible fiber and resin composite core comprehensive optical-fiber overhead wire is an energy-saving type capacity-increasing wire with a novel structure. Compared with a conventional wire, the wire of the disclosure has advantages including: light weight, high tensile strength, high heat resistance, small thermal expansion coefficient, small high-temperature sag, high electrical conductivity, low line loss, high current-carrying capacity, high corrosion resistance, and it is difficult for the wire to be coated by ice and the like.

It is an environmental-friendly power transmission line wire, and has the epoch-making practical significance on the aspects of protecting the environment, saving energy, reducing emission and improving the human ecological environment. The disclosure further combines the flexible fiber and resin composite core with the optical fiber technology to provide the flexible fiber and resin composite core comprehensive optical fiber overhead wire, which has functions from both the overhead wire and communication wire, as well as benefits from the advantages of the flexible fiber and resin composite core overhead wire. The wire of the disclosure greatly satisfies the requirements of various operational environments and particularly of large span overhead lines for power and communication transmission.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A flexible fiber and resin composite core overhead wire, comprising:
   a wire core comprising a main core and a plurality of auxiliary cores spirally and tightly stranded on the main core, wherein the main core and the auxiliary cores comprise:
   fiber resin strands formed by fiber filament bundles permeated with resin through moulding;
   fiber filaments, wound on and completely covering the fiber resin strands such that the fiber resin strand is isolated from the outside; and
   a conducting layer coating the wire core, and comprising at least one aluminum wire layer, wherein the at least one aluminum wire layer comprises a plurality of aluminum wires spirally and tightly stranded on the wire core, wherein the aluminum wires are duralumin of semi-duralumin or a combination of duralumin and soft aluminum or heat-resisting aluminum alloy or a combination of semi-duralumin and soft aluminum or heat-resisting aluminum alloy, wherein the main core and the auxiliary cores comprise at least one optical fiber unit strand, said at least one optical fiber unit strand comprises at least one optical fiber arranged therein.

2. The flexible fiber and resin composite core overhead wire according to claim 1, wherein the main core comprises 1 to 5 fiber resin strands and/or optical fiber unit strands, and one or two layers of the auxiliary cores are arranged on an outer side of the main core, wherein in the case of one layer of the auxiliary cores, 3 to 36 auxiliary cores are stranded as one layer on the main core, and in the case of two layers of the auxiliary cores, 3 to 36 auxiliary cores are stranded as an inner layer on the main core, other 7 to 42 auxiliary cores are stranded as an outer layer on an outer side of the inner layer of the auxiliary cores, and the two layers of auxiliary cores are opposite in stranding direction.

3. The flexible fiber and resin composite core overhead wire according to claim 1, wherein the stranding direction of the aluminum wires of the aluminum wire layer adjacent to the wire core is opposite to the stranding direction of the auxiliary cores, and in the case of at least two aluminum wire layers, the aluminum wires in each two adjacent aluminum wire layers are opposite in stranding direction.

4. The flexible fiber and resin composite core overhead wire according to claim 1, wherein the conducting layer comprises four aluminum wire layers, of which the aluminum wires have a trapezoid cross section, the four aluminum wire layers have m, n, o and p aluminum wires from inside to outside respectively, which are natural numbers greater than 5.

5. The flexible fiber and resin composite core overhead wire according to claim 1, wherein the aluminum wires have a trapezoid, Z-shaped or circular cross section.

6. The flexible fiber and resin composite core overhead wire according to claim 1, wherein the conducting layer comprises an inner aluminum wire layer and an outer aluminum wire layer, the aluminum wires of the inner aluminum wire layer have a concave cross section, and the aluminum wires of the outer aluminum wire layer have a convex cross section matched with the concave cross section of the inner aluminum wire layer; the aluminum wires of the inner aluminum wire layer have a convex cross section, and the aluminum wires of the outer aluminum wire layer have a concave cross section matched with the convex cross section of the inner aluminum wire layer.

7. The flexible fiber and resin composite core overhead wire according to claim 1, further comprising a strain clamp and an intermediate connecting tube, wherein the strain clamp comprises a clamp body, a steel anchor and a jumper wire clamper; the steel anchor comprises an anchor ring and an anchor body inserted into a front end of the clamp body; the anchor body comprises a pressure connecting part, a composite core connecting part and a first liner tube, wherein the pressure connecting part is provided with a plurality of annular grooves formed on an outer wall thereof, and the composite core connecting part is provided with an insertion hole formed therein, in which the first liner tube is arranged for tightly embracing the wire core; the clamp body has a steel anchor pressure connecting end formed at a front end thereof for a pressure connection with the pressure connecting part of the anchor body, and a wire pressure connecting end formed at a rear end thereof for a pressure connection with the conducting layer; the jumper wire clamper comprises a connecting block and a drainage block, wherein the connecting block comprises a hoop sleeved and welded on a middle part of the clamp body, and a drainage seat drooping downwards; the drainage seat is provided with a groove with an inverted U-shaped cross section formed at a lower portion thereof, and a deformation slot formed in a bottom position of the groove; the drainage seat are further provided with bolt holes formed at both sides of the groove; a top end of the drainage block is embedded into the groove and fastened by bolts mounted in the bolt holes; the intermediate connecting tube comprises a second liner tube for pressure-connecting two wire cores, and a steel tube and an aluminum tube for pressure-connecting two conducting layers and, the aluminum tube is sleeved on the steel tube.

\* \* \* \* \*